(No Model.) 2 Sheets—Sheet 1.

B. S. EVANS.
COTTON SEED PLANTER AND FERTILIZER DISTRIBUTER.

No. 259,299. Patented June 13, 1882.

Witnesses:
B. Carlyle Fenwick
J. P. Theo. Lang

Inventor:
Benjamin S. Evans
by his Attys
Mason Fenwick & Lawrence (No Model.) 2 Sheets—Sheet 2.
B. S. EVANS.
COTTON SEED PLANTER AND FERTILIZER DISTRIBUTER.
No. 259,299. Patented June 13, 1882.

Witnesses:
J. P. Theo. Lang
B. Carlyle Fenwick

Inventor:
Benjamin S. Evans
by his Attys
Mason Fenwick & Lawrence

UNITED STATES PATENT OFFICE.

BENJAMIN S. EVANS, OF ACRON, ALABAMA.

COTTON-SEED PLANTER AND FERTILIZER-DISTRIBUTER.

SPECIFICATION forming part of Letters Patent No. 259,299, dated June 13, 1882.

Application filed December 7, 1881. (No model.)

*To all whom it may concern:*

Be it known that I, BENJAMIN S. EVANS, a citizen of the United States, residing at Acron, in the county of Hale and State of Alabama, have invented a new and Improved Cotton-Seed Planter and Fertilizer-Distributer, of which the following is a specification.

My invention consists in certain constructions, combinations, and arrangements of parts, as will be hereinafter described and specifically claimed.

Figure 1:
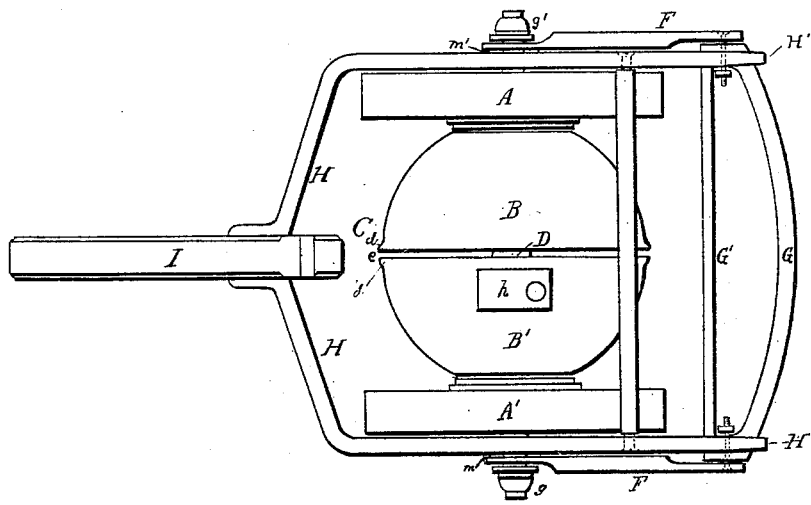
Figure 2:
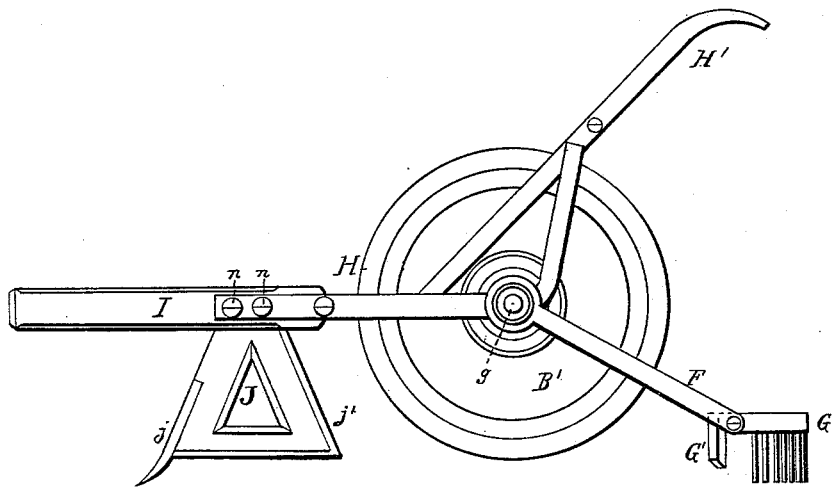
Figure 3:
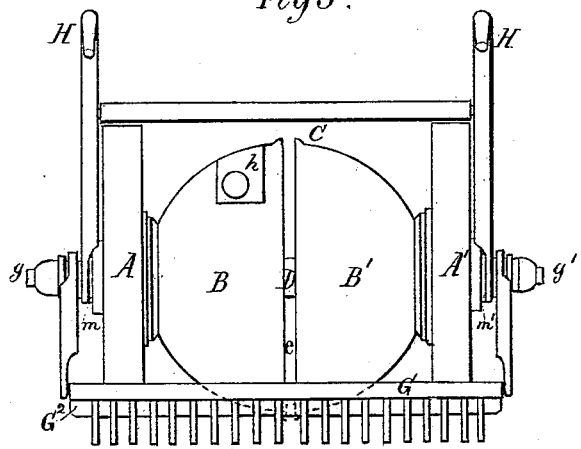
Figure 4:
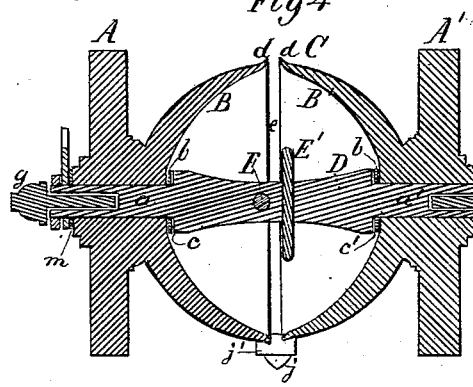
Figure 7:
Figure 5:
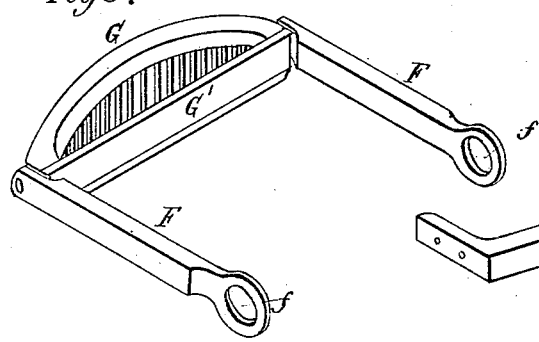
Figure 6:
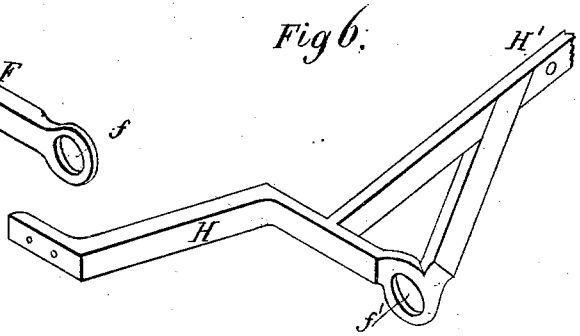

In the accompanying drawings, Figure 1 is a top view of my improved machine. Fig. 2 is a side view of the same. Fig. 3 is a rear view of the machine. Fig. 4 is a vertical transverse section of the same. Fig. 5 is a perspective view of the rear section of the framing, with harrow and smoothing leveling-board attached. Fig. 6 is a perspective view of one side of the front section of the framing. Fig. 7 is a detail section of one end of the axle, showing the headed clamping-screw.

To the propelling and supporting wheels A A' of the machine hollow hemispherical sections or portions B B' are applied or formed. These sections or portions form a hollow globular hopper, C. The wheels, with the portions B B' attached, are fitted loosely upon arms $a$ $a'$ of an axle, D, and abut against ring-washers $b$, applied upon the arms $a$ $a'$, and against the shoulders $c$ $c'$ of the axle, as shown.

Through the axle, near the middle of its length, stirrer-rods E E' are passed, the rod E running through the shaft so as to stand at a right angle to the rod E'.

In either the section B or B' a supply-opening, closed by a plug, $h$, is provided, and through this opening the seed or fertilizers are introduced into the hopper. The opposite edges $d$ of the sections B B' do not meet, but stand apart far enough to form a continuous discharge-passage, $e$, all around the globular hopper, and this discharge-passage can be widened or decreased by means of washers—such as those shown at $b$—it only being necessary, if it is desired to increase the space, to remove one or both of the washers, and if it is desired to decrease the space $e$ insert an additional washer or washers. By increasing the space $e$ the discharge of cotton-seed or fertilizer will be facilitated or increased, and by decreasing the space $e$ the feed or discharge will be retarded or decreased. The stirrer-rods E E' cause the seed to pass toward the discharge-passage $e$, and thus clogging is avoided. The hopper-sections B B' revolve with the wheels A A', and as the inner surfaces of the sections are on a curved incline the cotton-seed or fertilizers flow toward the discharge-passage from each side of the hopper.

To the arms $a$ $a'$ of the axle D a rear section of framing, F, having the harrow G and smoothing-bar G' pivoted to it, is hinged. A front section of framing, H, having the handles H' attached to it, is also hinged to said arms $a$ $a'$ of the axle D. The two sections of framing F and H are fitted, by means of hinging-eyes $f$ $f'$, upon the arms $a$ $a'$, and they are clamped in place by means of washers $m$ $m'$ and headed screw-clamps $g$ $g'$, which screw into threaded sockets $g^2$, formed in the ends of the arms of the axle, as illustrated in the drawings.

In Fig. 7 the manner in which the headed screw-clamps screw into the arms of the axle is shown, and notwithstanding that in Fig. 4 these screw-clamps are shown without a screw it is the intention to provide them with a screw-thread in all cases.

The front ends of the pieces forming the front framing portion, H, are screwed at $n$ to the tongue I of the machine, and by taking out the screws which fasten them to the tongue and removing the screw-clamps $g$ $g'$ the framing portions F and H can be removed and the wheels and hopper-sections taken off the axle. Thus great facility for adjusting the discharging capacity of the machine is secured.

The harrow G, with its smoothing-bar G', is pivoted to the vertically-swinging parts F of the framing, and while it is kept down to the ground by the gravitation of the said framing portions and the harrow its teeth are allowed to assume a position vertical with respect to the surface of the ground accordingly as the undulations thereof may require, and thus a more thorough harrowing of the seed or fertilizer into the earth will be effected than if the teeth stood at an inclination with respect to the surface of the ground passed over.

The plow-hoe J consists of a shovel-blade, $j$, attached to a stock, $j'$, of nearly triangular form, said stock being attached to the plow-beam I at a point forward of the hopper and in line with the discharge-passage thereof. The lower piece of this frame forms a furrow-presser behind the plow-hoe, and presses aside the soil after the furrow is opened by the blade j, so that the seed or fertilizer will enter into the furrow.

The triangular open-frame stock is strong and light, and effectually braces the shovel-blade, as well as insures the keeping open of the furrow, while the smoothing-bar and harrow-teeth cover in the seed or fertilizer very perfectly.

The hollow hemispherical portions B B' may be made with flat inclined sides internally and externally, or they may be similar to two truncated cones having their bases placed opposite one another. These sections, by revolving with the wheels, are operated without the aid of band or toothed gearing, and they distribute the fertilizer in a thin sheet directly into the furrow.

The washers b can be readily changed so as to vary the amount of feed from the hopper; and with full-sized machines a number of washers of different thicknesses may be provided on the arms of the axle, and spaces will be formed between the ends of the clamping-screws and the bottoms of the sockets $g^2$ in order to permit the setting up of the screws when one or more washers are removed. When the internal washers are removed thicker external washers are substituted for the thinner ones shown at m m'.

What I claim as my invention, and desire to secure by Letters Patent, is—

1. The seed and fertilizer distributing machine herein described, consisting of the axle D, provided with radial stirring-rods E, and shoulders c c' on the inside of the hopper-sections, the wheels A A', provided with the hollow hemispherical sections B B' on their inner faces or sides and separated by a continuous space, e, and the framing-sections F and H, washers b, and screw-clamping caps g g', all constructed and combined substantially as and for the purpose described.

2. The combination of the stationary axle D, radial stirring-rods E, revolving spaced hopper-sections B B', wheels A A', framing-sections F and H, and clamping cap-plugs g g', the whole constructed substantially in the manner and for the purpose herein described.

3. The harrow having a swinging movement on the axle D, and also a swinging movement on the section F of the framing, in combination with the framing-section H, furrow-opener, wheels A A', and hopper-sections B B', substantially in the manner and for the purpose described.

4. The furrow-opener stock j', made nearly in form of a skeleton triangle, in combination with the blade j, tongue I, framing-sections H F, wheels A A', spaced hopper-sections B B', axle D, stirrers E E, and harrow G, having covering or smoothing board G', substantially as described.

5. The cotton-seed planter provided with the two independently-hinged sections of framing H F and with the harrow G, having smoothing-board G', said harrow with smoothing-board being pivoted by horizontal pins to the section F of the framing, all substantially as and for the purpose described.

BENJAMIN S. EVANS.

Witnesses:
W. C. GERVIN,
W. E. WEDGWORTH.